US00RE34999E

United States Patent [19]

Kelly

[11] E Patent Number: Re. 34,999

[45] Reissued Date of Patent: Jul. 25, 1995

[54] HOLE TYPE FUEL INJECTOR AND INJECTION METHOD

[75] Inventor: William W. Kelly, Granby, Conn.

[73] Assignee: Stanadyne Automotive Corp., Windsor, Conn.

[21] Appl. No.: 71,526

[22] Filed: Jun. 2, 1993

Related U.S. Patent Documents

Reissue of:

[64] Patent No.: 5,020,500
Issued: Jun. 4, 1991
Appl. No.: 500,714
Filed: Mar. 28, 1990

[51] Int. Cl.[6] ..... F02M 41/00

[52] U.S. Cl. ..... 123/467; 123/496; 239/464

[58] Field of Search ..... 123/467, 447, 446, 445, 123/496; 239/88–96, 533.2–533.12, 452, 453, 464

[56] References Cited

U.S. PATENT DOCUMENTS

| | | |
|---|---|---|
| 1,944,371 | 1/1934 | Ritz . |
| 2,588,485 | 3/1952 | Clarke et al. . |
| 2,627,254 | 2/1953 | De Juhasz . |
| 3,032,279 | 5/1962 | Czarnecki . |
| 3,368,761 | 2/1968 | Pelizzoni . |
| 3,838,821 | 10/1974 | Berlyn . |
| 4,036,192 | 7/1977 | Nakayama . |
| 4,284,049 | 8/1981 | Chmela . |
| 4,394,972 | 7/1983 | Potter . |
| 4,436,247 | 3/1984 | Akagi . |
| 4,470,548 | 9/1984 | Ushimura . |
| 4,506,833 | 3/1985 | Yoneda et al. . |
| 4,524,914 | 6/1985 | Kaibura et al. . |
| 4,540,126 | 9/1985 | Yoneda et al. . |
| 4,627,571 | 12/1986 | Kato et al. . |
| 4,629,127 | 12/1986 | Kawamura et al. . |
| 4,684,067 | 8/1987 | Cotter et al. . |
| 4,693,420 | 9/1987 | Klomp . |
| RE-4,715,541 | 8/1991 | Freudenschuss et al. . |
| 4,811,715 | 3/1989 | Djordjevic et al. . |
| 4,957,085 | 9/1990 | Sverdlin . |

FOREIGN PATENT DOCUMENTS

| | | | |
|---|---|---|---|
| 46C3I3503A | 5/1951 | Germany . | |
| 3113755 | 12/1982 | Germany . | |
| 0093959 | 5/1984 | Japan | 123/467 |
| 59-93959 | 5/1984 | Japan . | |
| 136453 | 7/1952 | Sweden . | |

*Primary Examiner*—Carl S. Miller
*Attorney, Agent, or Firm*—Chilton, Alix & Van Kirk

[57] ABSTRACT

A hole type fuel injector with a nozzle body and needle valve having cooperating inner and outer metering rings providing a metering passage (a) to provide an initial reduced rate of fuel injection during an initial increment of valve lift, (b) to maintain fuel pressure at the valve seat to reduce fuel dribble and cavitation erosion during a corresponding last increment of valve closure and (c) to prevent secondary fuel injection.

28 Claims, 3 Drawing Sheets

HOLE TYPE FUEL INJECTOR AND INJECTION METHOD

Matter enclosed in heavy brackets [ ] appears in the original patent but forms no part of this reissue specification; matter printed in italics indicates the additions made by reissue.

BACKGROUND AND SUMMARY OF THE INVENTION

The present invention relates generally to fuel injectors for diesel engine fuel injection systems and relates more particularly to a new and improved hole type fuel injector and injection method.

A principal object of the present invention is to provide in a hole type fuel injector, a new and improved fuel injection nozzle assembly and method providing multi-stage fuel injection or rate shaping.

Another object of the present invention is to provide in a hole type fuel injector, a new and improved fuel injection nozzle assembly and method providing pre-injection.

A further object of the present invention is to provide in a hole type fuel injector, a new and improved fuel injection nozzle assembly and method providing fuel metering during all initial stage of valve operation.

A further object of the present invention is to provide in a hole type fuel injector, a new and improved fuel injection nozzle assembly and method which assists in maintaining fuel pressure at the valve seat until valve closure to reduce or eliminate secondary injections, end of injection fuel dribble and cavitation erosion of the valve seat and adjacent area.

A further object of the present invention is to provide in a hole type fuel injector, a new and improved nozzle assembly which fulfills one or more of the foregoing objects of the present invention and which has an economical design that can be manufactured at relatively low cost.

Other objects of the present invention will be in part obvious and in part pointed out more in detail hereinafter.

A better understanding of the invention will be obtained from the following detailed description and accompanying drawings of preferred embodiments of the present invention.

DESCRIPTION OF PREFERRED EMBODIMENTS

Figure 1:
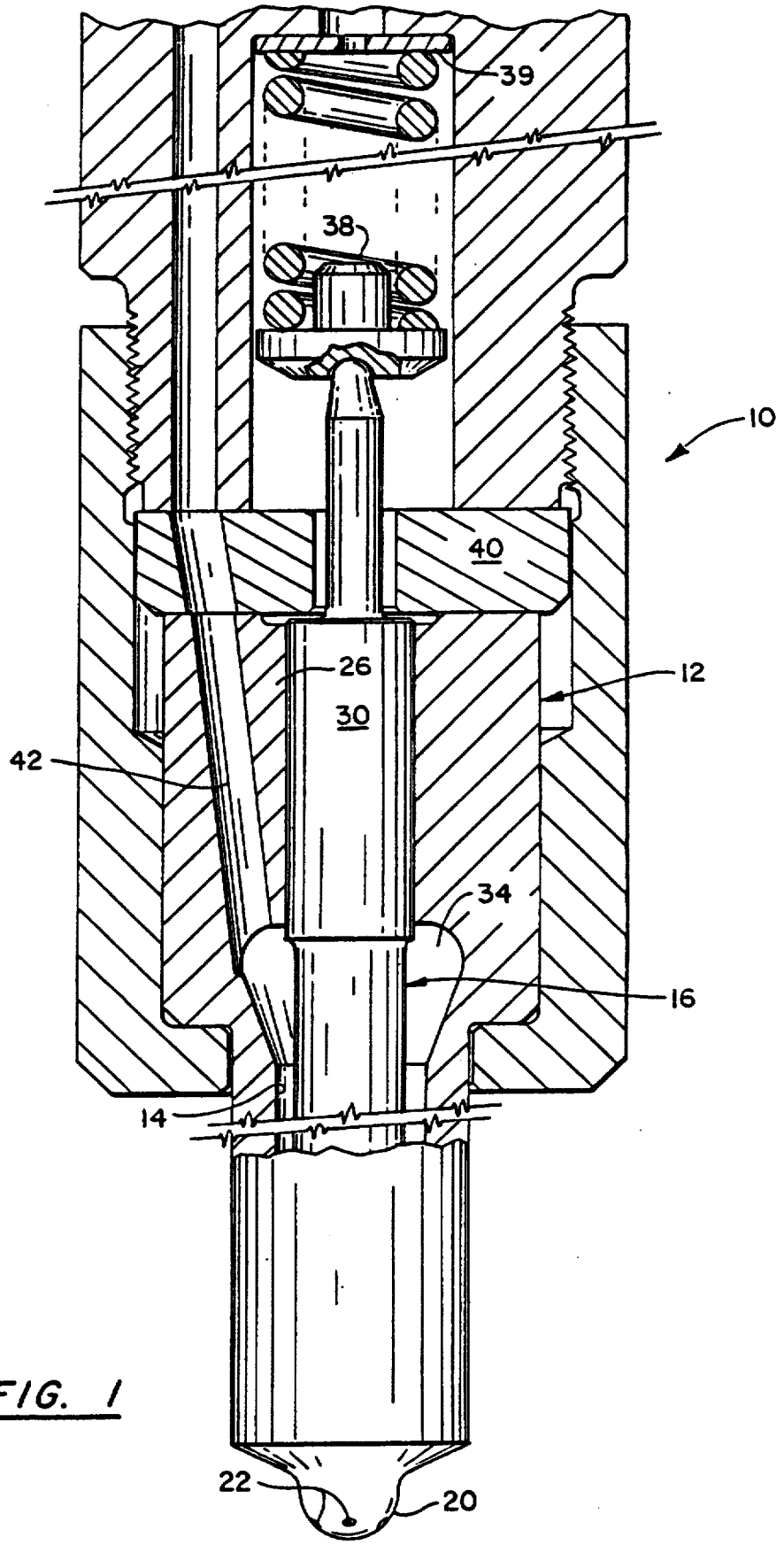
FIG. 1 is a longitudinal sectional view, partly broken away and partly in section, of a hole type fuel injector incorporating an embodiment of the present invention.
Figure 3:
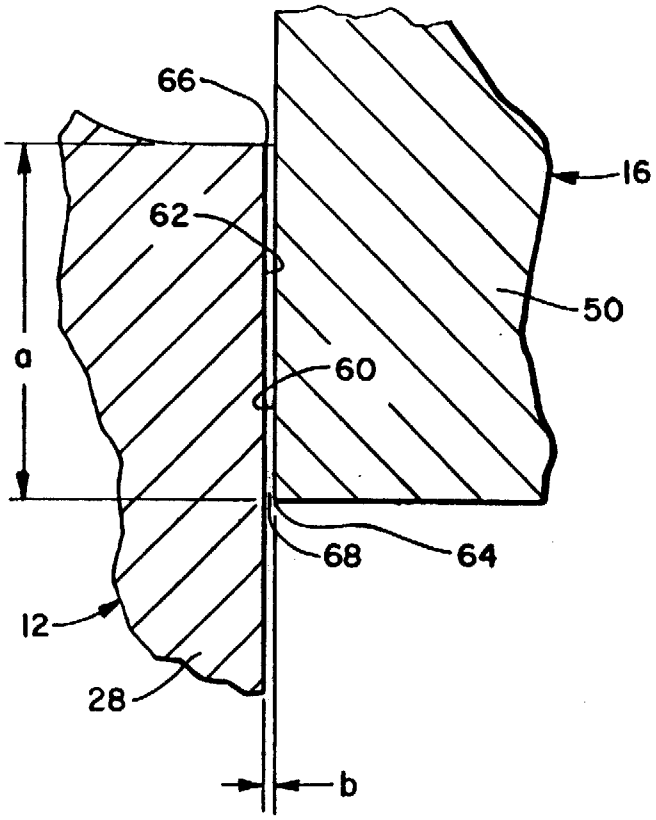
FIG. 3 is an enlarged longitudinal sectional view, partly broken away and partly in section, showing the relationship of inner and outer metering rings and metering edges of the nozzle body and needle valve when the valve is closed.
Figure 2:
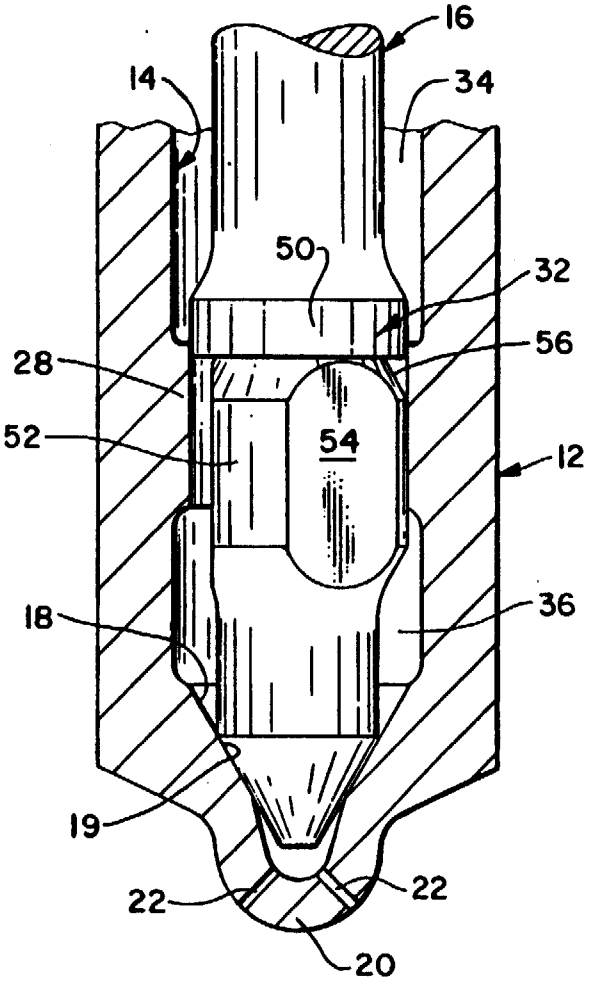
FIG. 2 is an enlarged longitudinal sectional view, partly broken away and partly in section, of a nozzle body and needle valve of the fuel injector.

In the drawings, like numerals represent the same or like parts. FIGS. 1–3 show a hole type fuel injector 10 comprising an elongated, one piece, nozzle body 12 with an elongated valve bore 14 and an elongated nozzle needle valve 16 axially reciprocable within the valve bore 14. Tile nozzle body 12 has a lower end tip 20 coaxial with and enclosing the lower end of the valve bore 14. The nozzle body 12 has an internal, upwardly facing, coaxial conical surface 18 providing an annular valve seat 19 immediately above the nozzle lip 20. The needle valve 16 has a lower conical end with approximately line contact engagement with the valve seat 19 when the valve is closed.

One or more small diameter spray holes 22 are provided below the valve seat 19 in the end tip 20. In the alternative (not shown), one or more spray holes 22 may be provided in the cortical surface 18 below the valve seat 19. In a conventional manner, the spray holes 22 provide for spraying small droplets of fuel for combustion. The number, diameter and exact location of the spray holes 22 are selected for each application.

The nozzle body 12 has upper and lower, coaxial valve guides 26, 28 which cooperate with upper and lower, coaxial guides 30, 32 of the needle valve 16 to guide the reciprocal movement of the needle valve 16. The upper valve guide 26 is located just below the top of the nozzle body 12 and the lower valve guide 28 is spaced below the upper valve guide 26 and above the valve seat 19. An upper annular fuel chamber 34 surrounding the needle valve 16 is provided between the upper and lower valve guides 26, 28. A lower annular fuel chamber 36 surrounding the needle valve 16 is provided between the lower valve guide 28 and valve seat 19.

A coil compression spring 38 mounted above the needle valve 16 urges the needle valve 16 downwardly to its closed position. A single spring 38 is shown. An additional second stage spring (not shown) may be used if desired to enhance, extend or modify the characteristics of the two stage valve operation hereinafter described. A shim 39 is employed to precisely set the pre-load of the spring 38 and thereby precisely establish the valve opening pressure (i.e., 1he pressure at which the needle valve 16 begins to lift off the valve seat 19). An adaptor plate 40 mounted on the nozzle body 12 serves as a stop engageable by the upper guide 30 of the needle valve 16 to limit valve lift. The needle valve 16 has a predetermined maximum lift which is preferably within the usual range of maximum lift of 0.008 to 0.016 inch of hole type nozzles.

The diameter of the upper guide 30 of the needle valve 16 is larger than the diameter of the annular valve seat 19 to provide a differential area for hydraulically lifting the needle valve 16 from the valve seat 19 for fuel injection. The needle valve 16 is periodically actuated by high pressure pulses of fuel supplied via one or more internal fuel passages 42 in the nozzle body 12 to the upper annular chamber 34. In a hole type nozzle, in most applications the high pressure pulses typically have a maximum pressure within a range of 4,000 to 17,000 psi. That maximum pressure and the valve opening pressure (which is typically within the range of 2,800 to 5,000 psi) are functions of the spring characteristics and pre-load setting of the closure spring 38 and the shape of the high pressure pulse. As hereinafter more fully described, each high pressure pulse acts on the described differential area to open the needle valve 16 against the bias of the closure spring 38 and to supply fuel for fuel injection through the spray holes 22.

The lower guide 32 of the needle valve 16 cooperates with the lower valve guide 28 to restrict or throttle fuel flow between the upper and lower fuel chambers 34, 36 during part of the reciprocable movement of the needle valve 16. Regulation is provided during an initial upward increment of travel and a corresponding last downward increment of travel of the needle valve 16. That increment is preferably within the range of approximately 0.004 to 0.008 inch or approximately one-half the maximum lift of the needle valve 16.

The lower guide 32 of the needle valve 16 has upper and lower spaced sections 80, 82 with outer cylindrical surfaces. The lower section 52 is shown having three equiangularly spaced, axially extending flats 54 providing axial passages for unrestricted fuel flow. A conical surface 56, in combination with the flats 54, provides a peripheral annulus between the spaced sections 50, 52 for connecting the upper ends of the three axial passages.

The lower part of the upper section 50 forms an inner metering ring 60 that is received within an outer metering ring 62 of the lower fixed guide 28 when the needle valve 16 is seated. The inner metering ring 60 has an external cylindrical metering surface with a lower circular metering edge 64. The outer metering ring 62 has an internal cylindrical metering surface with an upper circular metering edge 66. Each metering edge 64, 66 is a sharp edge formed in the shown embodiment by the respective cylindrical metering surface and an adjacent perpendicular shoulder. A clearance passage 68 having a radial clearance b is provided between the two opposing cylindrical metering surfaces. The diametrical clearance between the two metering surfaces in the shown embodiment is preferably within the range of 0.0003 to 0.0006 inch.

The lower section 52 is provided to maintain the concentricity of the inner and outer metering rings 62, 64. For nozzles which do not need a lower guide section 52 for that purpose, the lower guide section 52 and intermediate conical surface 56 and flats 54 may be excluded and the axial length of the lower valve guide 28 may be reduced accordingly.

The inner and outer metering rings 60, 62 cooperate to regulate flow between the upper and lower chambers 34, 36 during part of the upward and downward movement of the needle valve 16. Flow metering or throttling occurs during an initial increment of valve lift and a corresponding last increment of needle valve 16 closure. For example, with the valve closed as shown in FIG. 2, if the axial overlap a of the metering edges 64, 66 is 0.006 inch (i.e., metering rings 60, 62 have an axial width or overlap a of 0.006 inch), the annular metering rings 60, 62 cooperate to regulate flow during the initial upward and last downward increments of movement of the needle valve 16 of 0.006 inch. Both metering edges 64, 66 are preferably coaxial, circular edges as shown. In the alternative (not shown), one or both of the metering rings 60, 62 may have a different shape to provide a more gradual transition between regulated and non-regulated conditions as the needle valve 16 reciprocates.

Prior to valve opening, the pressure in the lower chamber 36 is essentially the same as that in the upper chamber 34. That is so, even during a rapid increase in pressure at the beginning of a high pressure pulse, because, with the needle valve 16 closed, only extremely little flow through the clearance passage 68 is required to equalize the pressure between the upper and lower chambers 34, 36. However, as the needle valve 16 lifts off the valve seat 19 and fuel flows through the clearance passage 68 and spray holes 22, the lower chamber pressure will be less than the upper chamber pressure due to the fuel throttling or metering provide by the clearance passage 68. Accordingly, the net hydraulic opening bias on the needle valve 16 will be less than before the needle valve 16 opened and less than it would have been if there were no restriction. Consequently, an upper chamber pressure higher than otherwise is required to open the needle valve 1 further. Further valve opening is therefore slowed or delayed for a short but meaningful period during which the rate of fuel injection is metered or throttled by the clearance passage 68.

Figure 4:
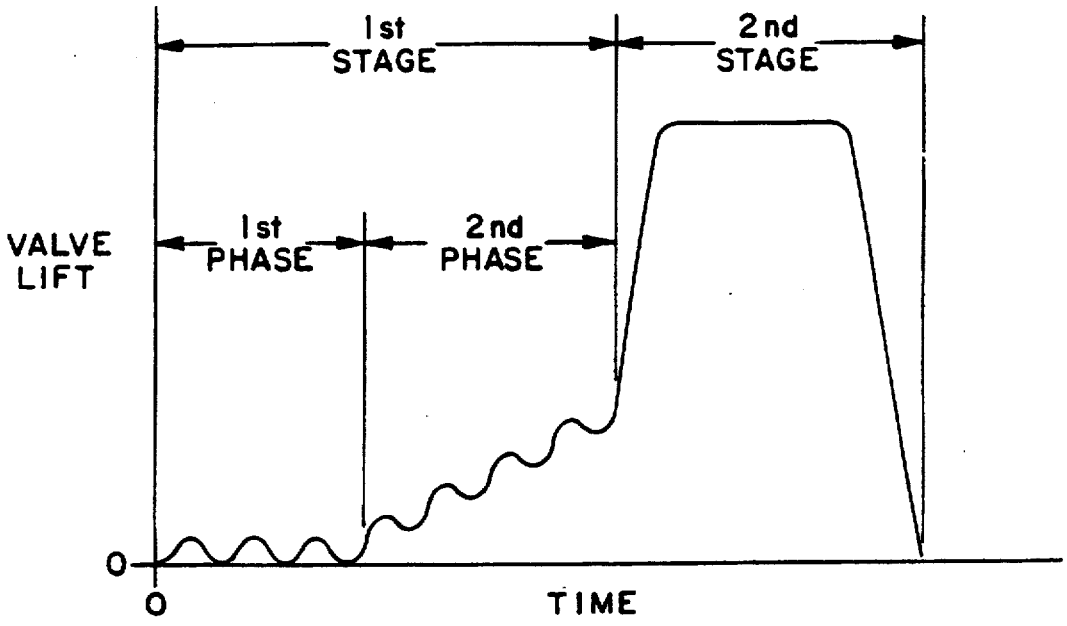
FIG. 4 is a graph showing the relationship of needle valve lift and time during an exemplary injection cycle of the fuel injector.

Thus, valve operation and fuel injection occur in two stages: a first stage of partial valve opening during which there is a regulated or reduced rate of fuel injection and a second stage of unthrotlled fuel injection. The first stage may be viewed as having two phases. During a first initial opening phase, as the upper chamber pressure rises above the valve opening pressure, the valve may modulate or dither briefly between open and closed positions. Valve modulation continues during a succeeding second phase when the upper chamber pressure is sufficiently high to keep the valve from closing. Second phase valve modulation continues until the total valve opening force produced by the different fuel pressures in the upper and lower chambers 34, 36 is sufficient to propel the valve upward to its fully open position. A representative fuel injection cycle is illustrated in FIG. 4.

The diameter of the lower guide 32 is selected to provide the the desired valve modulation. If the lower guide 32 diameter is less than or equal to the diameter of the valve seat 19, there will be no first stage valve modulation and the needle valve 16 will be propelled to its fully open position in a single step. At the other extreme, if the lower guide 32 diameter is equal to or greater than the diameter of the upper guide 30, the needle valve 16 will dither or fluctuate between open and closed positions and never fully open. Although each of those modes of operation may be desirable certain applications, in general the diameter of the lower guide 32 should lie in a central range between the diameter of the valve seat 19 and upper guide 30.

The two stage valve operation is affected by the pressure/time curve or shape of the high pressure fuel pulse. For any given fuel injection system, the pulse shape varies with engine speed. At higher engine speeds, the pressure of the high pressure pulse increases more rapidly, thereby giving less time for effective two stage operation to occur. As a result, first stage operation typically is more pronounced at lower RPM.

Certain nozzle dimensions or parameters are established for each application to provide the desired two stage and two phase operation. For a typical automotive diesel engine application (e.g., a four cylinder, two liter, engine with injectors which inject a charge having a maximum volume of approximately 40 $mm^3$ and operated by high pressure pulses having a maximum pressure which varies with engine speed flora 5,000 to 14,000 psi), the nozzle parameters and their preferred nominal dimensional range are as follows:

| Parameter | Nominal Dimensional Range |
|---|---|
| Diameter of upper valve guide 26 | 0.150 to 0.180 inch |
| Diameter of lower valve guide 28 | 0.120 to 0.160 inch |
| Diametrical clearance 68 | 0.0003 to 0.0006 inch |
| Diameter of valve seat 19 | 0.079 to 0.104 inch |
| Metering ring width a | 0.004 to 0.006 inch |
| Maximum valve lift | 0.008 to 0.012 inch |

In a typical automotive diesel engine application, it is generally desirable to inject approximately the first 5 $mm^3$ of fuel at a reduced rate to reduce combustion noise and nitrous oxide emissions. Optimum dimensions within the ranges given above are established to achieve that level of first stage injection. In other diesel engine applications, the optimum dimensions may be outside the ranges given. Also, the axial position of the metering rings 60, 62 relative to the valve seat 19 can affect the two stage operation. In general, it is believed that the metering rings 60, 62 should be located closer to the valve seat 19 than to the upper guides 26, 30 to reduce the volume of the lower fuel chamber 36 and to increase the responsiveness of needle valve 16.

As described, the cooperating inner and outer metering rings 60, 62 provide fuel throttling and therefore fuel rate shaping during the first stage of valve operation. First stage fuel regulation can be made relatively insensitive to valve lift by reducing the reliance on fuel metering between the needle valve 16 and valve seat 19. More effective and consistent rate shaping is thereby achieved. Also, first stage valve operation can be extended to higher speeds or otherwise enhanced or modified by adding a second stage closure spring (not shown). In such a two spring system, the first stage spring provides a first stage valve opening limit of for example 0.004 inch (for use in combination with a metering ring width a of 0.006 inch) and the second stage spring provides an additional second stage valve opening limit of for example 0.008 inch (giving a total valve lift of 0.012 inch). During the first stage of valve operation, the needle valve 16 would be temporarily held at the first stage limit position of 0.004 inch lift. During the second stage, the needle valve 16 would be held at the second stage limit position of 0.012 inch lift.

During second stage valve operation (for designs employing either one or two springs), the rate of fuel injection is not affected by the metering rings 60, 62. Also, the transition between the first and second stages, during which the cooperating metering rings 60, 62 have varying transitional affect, is extremely quick. In the first stage, valve behavior and thus the rate of fuel injection are determined primarily by the rate of fuel flow between the metering rings 60, 62. In the second stage, the needle valve 16 is quickly propelled to and held at its fully open position. The width, diameter and configuration of the metering rings are predetermined for each nozzle application to shape this two stage valve operation as desired.

The metering rings 60, 62 also affect fuel flow during valve closure. During the last increment of valve closure, the inner metering ring 60 serves as a pump to pressurize fuel in the lower chamber 36 and to restrict fuel flow between the upper and lower chambers 34, 36. The parameters and other factors discussed above will also impact that pumping action. Because of that pumping action, the fuel pressure at the spray holes 22 and valve seat 19 will be maintained at a higher pressure than otherwise until the needle valve 16 is completely closed. The higher pressure will help eliminate or reduce fuel dribble from the spray holes 22 and will help eliminate or reduce cavitation within the lower fuel chamber 36 by helping to both collapse and prevent vapor cavities which typically form at or near the valve seat 19 during valve closure. Cavitation erosion at or adjacent the valve seat 19 is thereby eliminated or reduced. In addition, the clearance passageway 68 will help dampen any pressure wave in the tapper chamber 34 (caused by reflection of the injection pulse and following each injection event) from reaching the lower fuel chamber 36 to eliminate undesirable "secondary" fuel injection and further minimize cavitation within the lower fuel chamber 36.

The injector 10 shown in the drawings is designed to be employed in fuel systems utilizing a remote high pressure pump connected to supply the high pressure fuel pulses to the fuel injector 10 via a high pressure fuel line. The present invention is also readily adaptable to other types of fuel injectors, for example unit injectors employing a high pressure pump as part of the fuel injector assembly. Also, as will be apparent to persons skilled in the art, other modifications, adaptations and variations of the foregoing specific disclosure can be made without departing from the teachings of the present invention.

I claim:

1. A hole type fuel injector comprising a nozzle body with an elongated valve bore, an annular valve seat and longitudinally spaced, tapper and lower valve guides above the valve seat; an elongated nozzle needle valve in the valve bore having upper and lower guides which cooperate with the upper and lower valve guides for axial movement of the needle valve within the valve bore between a lower closed position in engagement with the valve seat and an tapper fully open position with a predetermined lift; the nozzle body having a nozzle tip below the needle valve and enclosing the lower end of the valve bore and spray hole means connected to the valve bore below the valve seat; the nozzle body providing an tapper fuel chamber surrounding the needle valve between the upper and lower valve guides and a lower fuel chamber surrounding the needle valve between the lower valve guide and valve seat; valve closure spring means biasing the needle valve downwardly into engagement with the valve seat; the upper guide of the needle valve having a greater diameter than the valve seat to provide a differential area for hydraulically opening the needle valve against the bias of the closure spring means; the tapper fuel chamber being connected to receive periodic high pressure pulses of fuel for opening the needle valve against the bias of the closure spring means and for supplying fuel for fuel injection through the spray hole means; the lower valve guide forming an outer metering ring with an internal, annular metering surface with an tapper metering edge; the lower guide of the needle valve forming an inner metering ring with an external annular, metering surface with a lower metering edge; the inner metering ring, with the needle valve in its closed position, being received within the outer metering ring with the inner ring metering edge below the outer ring metering edge by a predetermined axial overlap substantially less than said predetermined lift and with a predetermined clearance between the inner and outer metering surfaces providing a metering passageway to regulate fuel flow between the upper and lower fuel chambers during an initial stage of upward movement of the needle valve from the valve seat.

2. A hole type fuel injector according to claim 1 wherein said axial overlap is approximately one-half said predetermined lift.

3. A hole type fuel injector according to claim 1 wherein said clearance is a diametrical clearance in the range of 0.0003 to 0.0006 inch.

4. A hole type fuel injector according to claim 1 wherein said axial overlap is no greater than approximately 0.008 inch.

5. A hole type fuel injector according to claim 1 wherein the outer ring metering edge is circular.

6. A hole type fuel injector according to claim 1 wherein the inner ring metering edge is circular.

7. A hole type fuel injector according to claim 1 wherein the inner ring metering surface is cylindrical.

8. A hole type fuel injector according to claim 1 wherein the outer ring metering surface is cylindrical.

9. A hole type fuel injector according to claim 1 wherein the closure spring means comprises a single spring.

[10. A fuel injector according to claim 1 wherein the inner metering ring has a diameter greater than that of the valve seat and less than that of the upper guide of the needle valve.]

11. A method of fuel injection with a hole type fuel injector comprising a nozzle body with an elongated valve bore, an annular valve seat and longitudinally spaced; upper and lower, valve guides above the valve seat; an elongated [non-pintle] needle valve in the valve bore having upper and lower guides which cooperate with the upper and lower valve guides for axial movement of the needle valve within the valve bore between a lower closed position in engagement with the valve seat and an upper fully open position having a predetermined lift no greater than approximately 0.016 inch; the nozzle body having a nozzle tip below the lower end of the needle valve enclosing the lower end of the valve bore and spray hole means connected to the valve bore below the valve seat; the nozzle body providing an upper fuel chamber surrounding the needle valve between the upper and lower valve guides and a lower fuel chamber surrounding the needle valve between the lower valve guide and valve seat; closure spring means biasing the needle valve downwardly into engagement with the valve seat; the upper guide of the needle valve having a greater diameter than the valve seat to provide a differential area for hydraulically opening the needle valve upwardly against the bias of the closure spring means; the lower guide of the needle valve having a greater diameter than the valve seat to provide a differential area for fuel pressure in the lower fuel chamber to hydraulically bias the needle valve upwardly against the bias of the closure spring means, the upper fuel chamber being connected to receive high pressure pulses of fuel for opening the needle valve against the bias of the closure spring means and for supplying fuel for fuel injection through the spray hole means; the method comprising the steps of providing a predetermined fuel metering passage between the lower guides of the nozzle body and needle valve for metering fuel between the upper and lower fuel chambers during only a predetermined initial increment of needle valve opening movement from its closed position substantially less than said predetermined lift and a corresponding last increment of needle valve closing movement, regulating the rate of fuel injection and the rate of opening movement of the needle valve during said initial increment of opening movement by metering fuel between the upper and lower fuel chambers via the passage during said initial increment of opening movement and metering fuel between the upper and lower chambers via the passage during said last increment of closing movement to assist in maintaining the pressure in the lower fuel chamber during said last increment of closing movement.

12. A fuel injection method according to claim 11 wherein said initial increment of opening movement is approximately one half said predetermined lift.

13. A fuel injection method according to claim 11 wherein said initial increment of opening movement is in the range of 0.004 to 0.008 inch.

14. A fuel injection method according to claim 11 wherein said predetermined lift is in the range of 0.008 to 0.016 inch.

15. A fuel injection method according to claim 11 wherein said metering passage is provided by an annular clearance passageway between the lower guides of the nozzle body and needle valve having a diametral clearance in the range of 0.0003 to 0.0006 inch.

[16. A fuel injection method according to claim 11 wherein the lower guide of the needle valve has a diameter greater than that of the valve seat and less than that of the upper guide of the needle valve.]

17. A fuel injector comprising a nozzle body with a valve bore, a valve seat and an upper valve guide above the valve seat; a valve member in the valve bore having an upper guide which cooperates with the upper valve guide for axial movement of the valve member within the valve bore between a lower closed position in engagement with the valve seat and an upper fully open position with a predetermined lift; the nozzle body having a nozzle tip below the valve member and enclosing the lower end of the valve bore and spray hole means connected to the valve bore below the valve seat; the nozzle body providing upper and lower, axially spaced fuel chambers surrounding the valve member between the upper valve guide and valve seat; valve closure spring means biasing the valve member downwardly into engagement with the valve seat; the upper guide of the valve member having a greater diameter than the valve seat to provide a differential area for hydraulically opening the valve member against the bias of the closure spring means; the upper fuel chamber being connected to receive periodic high pressure pulses of fuel for opening the valve member against the bias of the closure spring means and for supplying fuel for fuel injection through the spray hole means; the nozzle body forming an outer metering ring between the upper and lower fuel chambers having an internal, annular metering surface with an upper metering edge; the valve member forming an inner metering ring having an external annular, metering surface with a lower metering edge; the inner metering ring, with the valve member in its closed position, being received within the outer metering ring with the inner ring metering edge below the outer ring metering edge by a predetermined axial overlap substantially less than said predetermined lift and with a predetermined clearance between the inner and outer metering surfaces providing a metering passageway between the upper and lower chambers to regulate the rate of fuel injection during an initial increment of upward movement of the valve member from the valve seat and to assist in maintaining the pressure in the lower chamber during a corresponding last increment of closing movement of the valve member.

18. A fuel injector according to claim 17 wherein said axial overlap is approximately one-half said predetermined lift.

19. A fuel injector according to claim 17 wherein said clearance is a diametrical clearance in the range of 0.0003 to 0.0006 inch.

20. A fuel injector according to claim 17 wherein said axial overlap is no greater than approximately 0.008 inch.

[21. A fuel injector according to claim 17 wherein the inner metering ring has a diameter less than that of the upper guide of the valve member and greater than that of the valve seat.]

*22. A hole type fuel injector having a nozzle body with an elongated valve bore, annular valve seat and coaxial, longitudinally spaced, upper valve guide and lower outer ring above the valve seat; an elongated needle valve in the valve bore having coaxial, longitudinally spaced, upper guide and lower inner ring which cooperate with the valve guide and outer ring respectively of the nozzle body to provide axial movement of the needle valve within the valve bore between a lower closed position in engagement with the valve seat and an upper fully open position having a predetermined lift; the nozzle body having a nozzle tip below the needle valve enclosing the lower end of the valve bore and one or more spray holes connected to the valve bore below the valve seat for injection of fuel; the nozzle body providing an upper fuel chamber surrounding the needle valve between the valve guide and outer ring of the nozzle body and a lower fuel chamber surrounding the needle valve between the outer ring and valve seat of the nozzle body; and valve closure spring means biasing the needle valve downwardly into engagement with the valve seat; the upper guide of the needle valve having a greater diameter than both the inner ring and valve seat and the inner ring having a greater diameter than the valve seat to provide two differential areas for hydraulically opening the needle valve against the bias of the valve closure spring means; the upper fuel chamber being connected to receive periodic high pressure pulses of fuel for opening the needle valve against the bias of the spring means and for supplying fuel for fuel injection through each spray hole; the inner ring of the needle valve being substantially closer to the valve seat than to the upper guide of the needle valve; the outer ring and inner ring having cooperating internal and external metering surfaces respectively; the upper guides having a diameter in the range of approximately 0.150 to 0.180 inch; each of the metering surfaces having a diameter at its lower end less than 0.160 inch; the valve seat having a diameter in the range of approximately 0.079 to 0.104 inch; the inner metering ring, with the needle valve in its closed position, being received within the outer metering ring with a predetermined metering clearance between the internal and external metering surfaces for metering fuel between the upper and lower fuel chambers during predetermined initial upward movement of the needle valve from its closed position of at least 0.004 inch and during predetermined downward movement of the needle valve to its closed position.*

*23. A hole type fuel injector according to claim 22 wherein the metering clearance is provided by an annular clearance, between the internal and external metering surfaces, having a diametral clearance, with the needle valve in its closed position, in the range of approximately 0.0003 to 0.0006 inch.*

*24. A hole type fuel injector according to claim 22 wherein the external metering surface is cylindrical.*

*25. A hole type fuel injector according to claim 22 wherein the internal metering surface is cylindrical.*

*26. A hole type fuel injector according to claim 22 wherein the closure spring means is a single compression spring.*

*27. A method of fuel injection with a hole type fuel injector having a nozzle body with an elongated valve bore, annular valve seat and coaxial, longitudinally spaced, upper valve guide and lower outer ring above the valve seat; an elongated needle valve in the valve bore having coaxial, longitudinally spaced, upper guide and lower inner ring which cooperate with the valve guide and outer ring respectively of the nozzle body to provide axial movement of the needle valve within the valve bore between a lower closed position in engagement with the valve seat and an upper fully open position having a predetermined lift; the nozzle body having a nozzle tip below the needle valve enclosing the lower end of the valve bore and one or more spray holes connected to the valve bore below the valve seat for injection of fuel; the nozzle body providing an upper fuel chamber surrounding the needle valve between the valve guide and outer ring of the nozzle body and a lower fuel chamber surrounding the needle valve between the outer ring and valve seat of the nozzle body; and closure spring means biasing the needle valve downwardly into engagement with the valve seat; the outer ring and inner ring having cooperating internal and external metering surfaces respectively; the upper guide of the needle valve having a greater diameter than both the inner ring of the needle valve and the valve seat and the inner ring of the needle valve having a greater diameter than the valve seat to provide two differential areas for hydraulically opening the needle valve against the bias of the valve closure spring means; the upper fuel chamber being connected to receive periodic high pressure pulses of fuel for opening the needle valve against the bias of the spring means and for supplying fuel for fuel injection through each spray hole; the method comprising the steps of providing the inner and outer rings substantially closer to the valve seat than to the upper guides of the nozzle body and needle valve respectively; providing upper guides with a diameter in the range of approximately 0.150 to 0.180 inch; providing an external metering surface with a diameter at its lower end less than 0.160 inch; providing a valve seat having a diameter in the range of approximately 0.79 to 0.104 inch; and providing a predetermined metering clearance between the internal and external metering surfaces for metering fuel between the upper and lower fuel chambers during predetermined upward movement of the needle valve from its closed position of at least 0.004 inch and during predetermined downward movement of the needle valve to its closed position, regulating the rate of fuel injection and the rate of movement of the needle valve during said predetermined upward movement of the needle valve by motoring fuel between the upper and lower fuel chambers via said motoring clearance during said predetermined upward movement and metering fuel between the upper and lower chambers via said metering clearance during said predetermined downward movement to assist in maintaining the pressure in the lower fuel chamber during said predetermined downward movement.*

*28. A method of fuel injection according to claim 27, wherein the metering clearance is provided by an annular clearance, between the internal and external metering surfaces, having a diametral clearance, with the needle valve in its closed position, in the range of approximately 0.0003 to 0.0006 inch.*

*29. A method of fuel injection according to claim 27, wherein the external metering surface is a cylindrical metering surface.*

*30. A method of fuel injection according to claim 27 wherein the internal metering surface is a cylindrical metering surface.*

*31. A method of fuel injection according to claim 27 wherein the closure spring means is a single compression spring.*

* * * * *

UNITED STATES PATENT AND TRADEMARK OFFICE

CERTIFICATE OF CORRECTION

PATENT NO. : Re. 34,999
DATED : July 25, 1995
INVENTOR(S) : William W. Kelly

It is certified that error appears in the above-identified patent and that said Letters Patent is hereby corrected as shown below:

Column 6, line 30, "tapper" should read -- upper --; line 36, "tapper" should read -- upper --; line 41, "tapper" should read -- upper --; line 50, "tapper" should read -- upper--; line 56, "tapper" should read -- upper--.

Column 10, line 57, "motoring" should read --metering--.

Signed and Sealed this

Third Day of February, 1998

*Attest:*

BRUCE LEHMAN

*Attesting Officer*

*Commissioner of Patents and Trademarks*

UNITED STATES PATENT AND TRADEMARK OFFICE

CERTIFICATE OF CORRECTION

PATENT NO. : Re. 34,999

DATED : July 25, 1995

INVENTOR(S) : William W. Kelly

It is certified that error appears in the above-indentified patent and that said Letters Patent is hereby corrected as shown below:

Column 6, line 30, "tapper" should read --upper--; line 36, "tapper" should read --upper--; line 41, "tapper" should read --upper--; line 45, before "valve" (first occurrence) insert --and--; line 48, delete "the valve seat to provide a differential area" and insert in place thereof --both the lower guide of the needle valve and the valve seat and the lower guide of the needle valve having a greater diameter than the valve seat to provide two differential areas--; line 50, "tapper" should read --upper--; line 56, "tapper" should read --upper--; line 59, after the semicolon insert --the upper guides having a diameter in the range of approximately 0.150 to 0.180 inch; the inner metering ring having a diameter at its lower end less than 0.160 inch; the valve seat having a diameter in the range of approximately 0.079 to 0.104 inch;--.

Column 7, line 1, delete "an initial stage of" and insert in place thereof --predetermined--; line 45, insert --and-- before "closure"; line 52, "greater diameter" should read --diameter greater--; line 52, after "seat" insert --and less than the upper guide of the needle valve--; line 60, after

UNITED STATES PATENT AND TRADEMARK OFFICE

CERTIFICATE OF CORRECTION

PATENT NO. : Re. 34,999

DATED : July 25, 1995

INVENTOR(S) : William W. Kelly

It is certified that error appears in the above-indentified patent and that said Letters Patent is hereby corrected as shown below:

"steps of" insert --providing the lower guides substantially closer to the valve seat than to the upper guides; providing upper guides with a diameter in the range of approximately 0.150 to 0.180 inch; providing a valve seat having a diameter in the range of approximately 0.079 to 0.104 inch; and--; line 64, delete "only a"; line 64, delete "increment of needle valve"; line 65, after "movement" insert --of the needle valve--; lines 65 - 67, delete "substantially less than said predetermined lift and a corresponding last increment of needle valve" and insert in place thereof --and during predetermined--; line 67, after "movement" insert --of the needle valve to its closed position--.

Column 8, lines 1 and 2, "initial increment of" should read --predetermined initial--; line 2, after "movement" insert --of the needle valve--; line 4, "initial increment of" should read --predetermined initial--; line 6, delete "last increment of" and insert in place thereof --predetermined--; line 8, delete "last increment of" and insert in place thereof --predetermined--; line 11, "initial increment of" should read

UNITED STATES PATENT AND TRADEMARK OFFICE

CERTIFICATE OF CORRECTION

PATENT NO. : Re. 34,999
DATED : July 25, 1995
INVENTOR(S) : William W. Kelly

It is certified that error appears in the above-identified patent and that said Letters Patent is hereby corrected as shown below:

--predetermined initial--; line 14, "initial increment of" should read --predetermined initial--; line 41, after the semicolon insert --and--; line 57, after the semicolon insert --the inner metering ring having a diameter less than the upper guide of the valve member and greater than the valve seat to provide a differential area for fuel pressure in the lower fuel chamber to hydraulically bias the needle valve upwardly against the bias of the spring means, the upper guides having a diameter in the range of approximately 0.150 to 0.180 inch; the valve seat having a diameter in the range of approximately 0.079 to 0.104 inch;--; lines 65 and 66, delete "an initial increment of" and insert in place thereof --predetermined--.

Column 9, lines 1 and 2, delete "a corresponding last increment of" and insert in place thereof --predetermined--; line 2, after "member" insert --into engagement with the valve seat--.

Column 10, line 57, "motoring" should read --metering--.

Signed and Sealed this

Fourth Day of July, 2000

*Attest:*

Q. TODD DICKINSON

*Attesting Officer*

*Director of Patents and Trademarks*